US012598264B2

(12) United States Patent
Cao et al.

(10) Patent No.: US 12,598,264 B2
(45) Date of Patent: Apr. 7, 2026

(54) COLOR CORRECTION FOR ELECTRONIC DEVICE WITH IMMERSIVE VIEWING

(71) Applicant: Apple Inc., Cupertino, CA (US)

(72) Inventors: Renbo Cao, San Jose, CA (US);
Yonghui Zhao, San Jose, CA (US);
Yingjun Bai, San Jose, CA (US);
Xuemei Zhang, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 259 days.

(21) Appl. No.: 18/613,004

(22) Filed: Mar. 21, 2024

(65) Prior Publication Data

US 2024/0406334 A1 Dec. 5, 2024

Related U.S. Application Data

(60) Provisional application No. 63/505,143, filed on May 31, 2023.

(51) Int. Cl.
| | |
|---|---|
| *G06K 9/00* | (2022.01) |
| *G06T 17/00* | (2006.01) |
| *G06V 10/56* | (2022.01) |
| *G06V 10/60* | (2022.01) |
| *H04N 1/60* | (2006.01) |

(52) U.S. Cl.
CPC .............. *H04N 1/60* (2013.01); *G06T 17/00* (2013.01); *G06V 10/56* (2022.01); *G06V 10/60* (2022.01)

(58) Field of Classification Search
USPC ....... 382/100, 103, 123, 156, 167, 173, 181, 382/254, 305, 312; 348/14.1
See application file for complete search history.

(56) References Cited

U.S. PATENT DOCUMENTS

| | | | | |
|---|---|---|---|---|
| 9,479,732 | B1 * | 10/2016 | Saleh | ..................... H04N 7/142 |
| 9,842,530 | B2 * | 12/2017 | Carlsson | .............. G09G 3/2007 |
| 9,953,556 | B2 | 4/2018 | Sridharan et al. | |

(Continued)

FOREIGN PATENT DOCUMENTS

| | | |
|---|---|---|
| KR | 20150079004 A | 7/2015 |
| KR | 20180011539 A | 2/2018 |

(Continued)

*Primary Examiner* — Seyed H Azarian
(74) *Attorney, Agent, or Firm* — Treyz Law Group; Jason Tsai

(57) ABSTRACT

An electronic device is provided that includes one or more image sensors configured to capture a video feed, an image signal processor configured to perform color correction on the captured video feed based on a brightness level computed from the captured video feed and/or based on a color temperature or illuminant type of the lighting in the captured video feed to generate a corresponding color corrected video feed using a first chromatic adaptation model that is adapted to an immersive viewing condition, and one or more displays configured to output the color corrected video feed. The electronic device can further include a recording pipeline configured to record a version of the captured video feed and can share or transmit the recorded content to an external device. The external device can display the recorded content using a second chromatic adaptation model that is adapted to a non-immersive viewing condition.

16 Claims, 7 Drawing Sheets

(56) References Cited

U.S. PATENT DOCUMENTS

| | | | | |
|---|---|---|---|---|
| 2013/0147896 A1* | 6/2013 | Cook | .................... | H04N 7/142 |
| | | | | 348/14.1 |
| 2017/0213494 A1 | 7/2017 | Carlsson et al. | | |
| 2020/0105226 A1* | 4/2020 | Greenebaum | ............ | G09G 5/10 |
| 2020/0380938 A1* | 12/2020 | Greenebaum | ............ | G09G 5/06 |
| 2021/0232201 A1* | 7/2021 | Chen | ...................... | G06F 9/547 |
| 2021/0286502 A1* | 9/2021 | Lemay | ................... | G06F 3/011 |
| 2021/0358187 A1 | 11/2021 | Kuang et al. | | |
| 2024/0029218 A1 | 1/2024 | Jia et al. | | |

FOREIGN PATENT DOCUMENTS

| | | |
|---|---|---|
| KR | 20210021062 A | 2/2021 |
| WO | 2017084091 A1 | 5/2017 |
| WO | 2019046334 A1 | 3/2019 |

* cited by examiner

ELECTRONIC DEVICE —10

CONTROL CIRCUITRY —20

COMMUNICATIONS CIRCUITRY —22

INPUT-OUTPUT DEVICES —24

DISPLAY(S) —14

SENSORS —16

OTHER —18

105 →

106

112

114

46

14

14

46

10

102

102

101

101

100

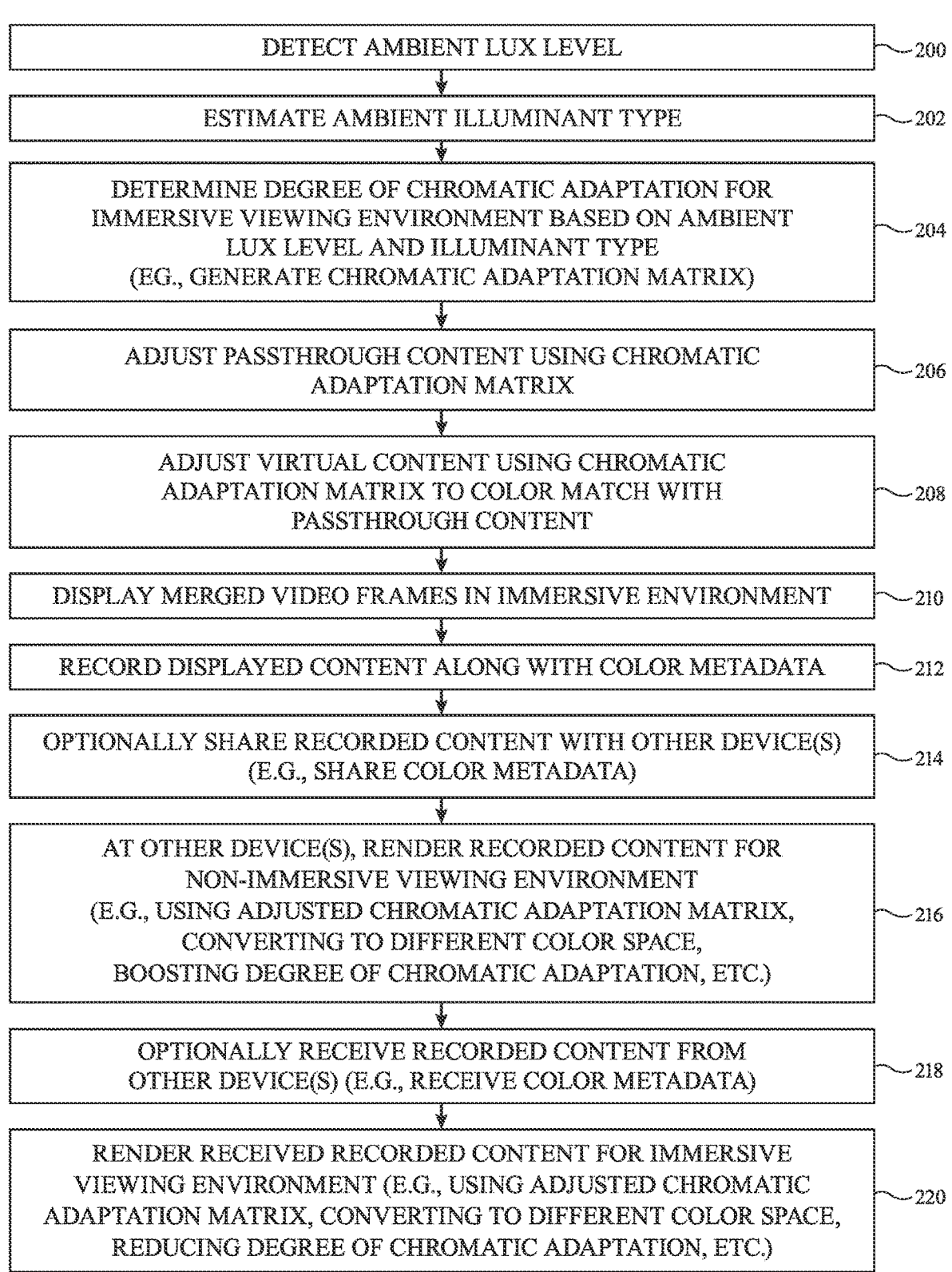

| | |
|---|---|
| DETECT AMBIENT LUX LEVEL | 200 |
| ESTIMATE AMBIENT ILLUMINANT TYPE | 202 |
| DETERMINE DEGREE OF CHROMATIC ADAPTATION FOR IMMERSIVE VIEWING ENVIRONMENT BASED ON AMBIENT LUX LEVEL AND ILLUMINANT TYPE (EG., GENERATE CHROMATIC ADAPTATION MATRIX) | 204 |
| ADJUST PASSTHROUGH CONTENT USING CHROMATIC ADAPTATION MATRIX | 206 |
| ADJUST VIRTUAL CONTENT USING CHROMATIC ADAPTATION MATRIX TO COLOR MATCH WITH PASSTHROUGH CONTENT | 208 |
| DISPLAY MERGED VIDEO FRAMES IN IMMERSIVE ENVIRONMENT | 210 |
| RECORD DISPLAYED CONTENT ALONG WITH COLOR METADATA | 212 |
| OPTIONALLY SHARE RECORDED CONTENT WITH OTHER DEVICE(S) (E.G., SHARE COLOR METADATA) | 214 |
| AT OTHER DEVICE(S), RENDER RECORDED CONTENT FOR NON-IMMERSIVE VIEWING ENVIRONMENT (E.G., USING ADJUSTED CHROMATIC ADAPTATION MATRIX, CONVERTING TO DIFFERENT COLOR SPACE, BOOSTING DEGREE OF CHROMATIC ADAPTATION, ETC.) | 216 |
| OPTIONALLY RECEIVE RECORDED CONTENT FROM OTHER DEVICE(S) (E.G., RECEIVE COLOR METADATA) | 218 |
| RENDER RECEIVED RECORDED CONTENT FOR IMMERSIVE VIEWING ENVIRONMENT (E.G., USING ADJUSTED CHROMATIC ADAPTATION MATRIX, CONVERTING TO DIFFERENT COLOR SPACE, REDUCING DEGREE OF CHROMATIC ADAPTATION, ETC.) | 220 |

*FIG. 8*

COLOR CORRECTION FOR ELECTRONIC DEVICE WITH IMMERSIVE VIEWING

This application claims the benefit of U.S. Provisional Patent Application No. 63/505,143, filed May 31, 2023, which is hereby incorporated by reference herein in its entirety.

FIELD

This relates generally to electronic devices, and, more particularly, to electronic devices such as head-mounted devices.

BACKGROUND

Electronic devices such as head-mounted devices may have cameras for capturing a video feed of an external scene and one or more displays for presenting the captured video feed of the scene to a user. Head-mounted devices can include hardware or software subsystems for processing the video feed, such as hardware/software subsystems for performing color correction on the captured video feed.

It can be challenging to design a head-mounted device in which the user is presented with such passthrough video feed of a scene. When the head-mounted device is worn by the user, the user views the passthrough video feed under a particular immersive viewing condition. When the user removes the head-mounted device, the user might view the video content on a display under a non-immersive viewing condition that is potentially significantly different than the immersive viewing condition as viewed through the head-mounted device. The user's eye will color adapt differently to the immersive viewing condition and the non-immersive viewing condition. If care is not taken, the user might perceive different colors when viewing the same scene under the immersive viewing condition and the non-immersive viewing condition.

SUMMARY

An electronic device such as a head-mounted device may include one or more cameras for capturing a video feed of a real-world environment and one or more displays for presenting a passthrough video feed to a user. The electronic device may include processing circuitry for performing one or more processing functions on the captured video feed to generate the passthrough video feed.

An aspect of the disclosure provides a method of operating an electronic device having one or more image sensors and one or more displays. The method can include capturing a video feed using the one or more image sensors, performing color correction on the captured video feed based on a brightness level computed from the captured video feed to generate a corresponding color corrected video feed that is adapted to an immersive viewing condition, and outputting the color corrected video feed using the one or more displays of the electronic device. The method can include computing the brightness level using calibrated linear camera signals in the electronic device and translating the calibrated linear camera signals to the brightness level using a linear regression model. The method can include performing the color correction comprises using a first chromatic adaptation model that is adapted to the immersive viewing condition to generate the color corrected video feed. The first chromatic adaptation model can be a function of a peak brightness level of the one or more displays.

The method can further include recording a version of the captured video feed and sending the recorded version of the captured video feed to an external electronic device, where the external electronic device is configured to display the recorded version of the captured video feed that has been color corrected using a second chromatic adaptation model that is adapted to a non-immersive viewing condition. The method can further include receiving content from an external electronic device and outputting the received content using the one or more displays that has been color corrected using the first chromatic adaptation model that is adapted to the immersive viewing condition.

An aspect of the disclosure provides a method that includes capturing a video feed using one or more image sensors, performing color correction on the captured video feed based on a color temperature or illuminant type of lighting in the captured video feed to generate a corresponding color corrected video feed that is adapted to an immersive viewing condition, and outputting the color corrected video feed using one or more displays. The color correction can be performed using a chromatic adaptation model that is adapted to the immersive viewing condition to generate the color corrected video feed.

An aspect of the disclosure provides a method that includes capturing a video feed, rendering the video feed for immersive viewing using a chromatic adaptation matrix, modifying the chromatic adaptation matrix, and rendering the video feed for non-immersive viewing using the modified chromatic adaptation matrix. The method can include generating the chromatic adaptation matrix based on a brightness level computed from the captured video feed, based on a color temperature of ambient light in the captured video feed, and/or based on the detected type of light source in the captured video feed. The chromatic adaptation matrix can be a function of a peak brightness level of one or more displays in an electronic device.

An aspect of the disclosure provides a method that includes capturing a video feed, rendering the captured video feed for non-immersive viewing using a chromatic adaptation matrix, modifying the chromatic adaptation matrix, and rendering the captured video feed for immersive viewing using the modified chromatic adaptation matrix.

BRIEF DESCRIPTION OF THE DRAWINGS

FIG. 8 is a flow chart of illustrative steps for operating an electronic device of the type shown in FIGS. 1-7 in accordance with some embodiments.

DETAILED DESCRIPTION

Figure 1:
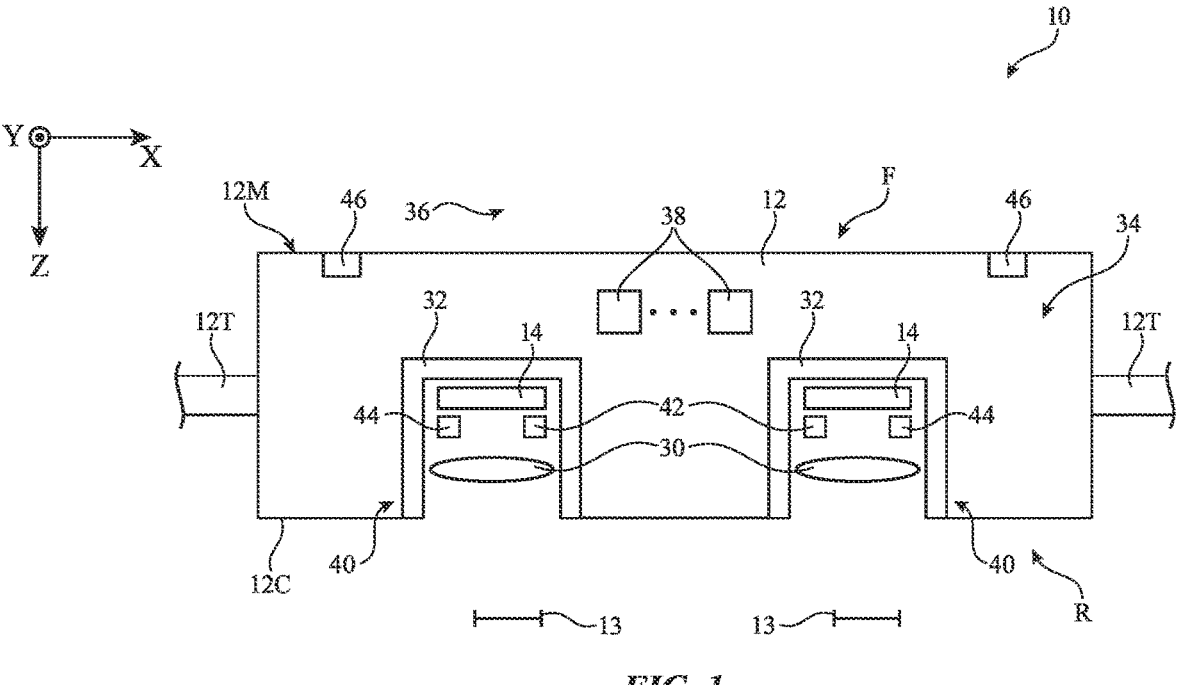
FIG. 1 is a top view of an illustrative head-mounted device in accordance with some embodiments.

A top view of an illustrative head-mounted device is shown in FIG. 1. As shown in FIG. 1, head-mounted devices such as electronic device 10 may have head-mounted support structures such as housing 12. Housing 12 may include portions (e.g., head-mounted support structures 12T) to allow device 10 to be worn on a user's head. Support structures 12T may be formed from fabric, polymer, metal, and/or other material. Support structures 12T may form a strap or other head-mounted support structures to help support device 10 on a user's head. A main support structure (e.g., a head-mounted housing such as main housing portion 12M) of housing 12 may support electronic components such as displays 14.

Main housing portion 12M may include housing structures formed from metal, polymer, glass, ceramic, and/or other material. For example, housing portion 12M may have housing walls on front face F and housing walls on adjacent top, bottom, left, and right side faces that are formed from rigid polymer or other rigid support structures, and these rigid walls may optionally be covered with electrical components, fabric, leather, or other soft materials, etc. Housing portion 12M may also have internal support structures such as a frame (chassis) and/or structures that perform multiple functions such as controlling airflow and dissipating heat while providing structural support.

The walls of housing portion 12M may enclose internal components 38 in interior region 34 of device 10 and may separate interior region 34 from the environment surrounding device 10 (exterior region 36). Internal components 38 may include integrated circuits, actuators, batteries, sensors, and/or other circuits and structures for device 10. Housing 12 may be configured to be worn on a head of a user and may form glasses, spectacles, a hat, a mask, a helmet, goggles, and/or other head-mounted device. Configurations in which housing 12 forms goggles may sometimes be described herein as an example.

Front face F of housing 12 may face outwardly away from a user's head and face. Opposing rear face R of housing 12 may face the user. Portions of housing 12 (e.g., portions of main housing 12M) on rear face R may form a cover such as cover 12C (sometimes referred to as a curtain). The presence of cover 12C on rear face R may help hide internal housing structures, internal components 38, and other structures in interior region 34 from view by a user.

Device 10 may have one or more cameras such as cameras 46 of FIG. 1. Cameras 46 that are mounted on front face F and that face outwardly (towards the front of device 10 and away from the user) may sometimes be referred to herein as forward-facing or front-facing cameras. Cameras 46 may capture visual odometry information, image information that is processed to locate objects in the user's field of view (e.g., so that virtual content can be registered appropriately relative to real-world objects), image content that is displayed in real time for a user of device 10, and/or other suitable image data. For example, forward-facing (front-facing) cameras may allow device 10 to monitor movement of the device 10 relative to the environment surrounding device 10 (e.g., the cameras may be used in forming a visual odometry system or part of a visual inertial odometry system). Forward-facing cameras may also be used to capture images of the environment that are displayed to a user of the device 10. If desired, images from multiple forward-facing cameras may be merged with each other and/or forward-facing camera content can be merged with computer-generated content for a user.

Device 10 may have any suitable number of cameras 46. For example, device 10 may have K cameras, where the value of K is at least one, at least two, at least four, at least six, at least eight, at least ten, at least 12, less than 20, less than 14, less than 12, less than 10, 4-10, or other suitable value. Cameras 46 may be sensitive at infrared wavelengths (e.g., cameras 46 may be infrared cameras), may be sensitive at visible wavelengths (e.g., cameras 46 may be visible cameras), and/or cameras 46 may be sensitive at other wavelengths. If desired, cameras 46 may be sensitive at both visible and infrared wavelengths.

Device 10 may have left and right optical modules 40. Optical modules 40 support electrical and optical components such as light-emitting components and lenses and may therefore sometimes be referred to as optical assemblies, optical systems, optical component support structures, lens and display support structures, electrical component support structures, or housing structures. Each optical module may include a respective display 14, lens 30, and support structure such as support structure 32. Support structure 32, which may sometimes be referred to as a lens support structure, optical component support structure, optical module support structure, or optical module portion, or lens barrel, may include hollow cylindrical structures with open ends or other supporting structures to house displays 14 and lenses 30. Support structures 32 may, for example, include a left lens barrel that supports a left display 14 and left lens 30 and a right lens barrel that supports a right display 14 and right lens 30.

Displays 14 may include arrays of pixels or other display devices to produce images. Displays 14 may, for example, include organic light-emitting diode pixels formed on substrates with thin-film circuitry and/or formed on semiconductor substrates, pixels formed from crystalline semiconductor dies, liquid crystal display pixels, scanning display devices, and/or other display devices for producing images.

Lenses 30 may include one or more lens elements for providing image light from displays 14 to respective eyes boxes 13. Lenses may be implemented using refractive glass lens elements, using mirror lens structures (catadioptric lenses), using Fresnel lenses, using holographic lenses, and/or other lens systems.

When a user's eyes are located in eye boxes 13, displays (display panels) 14 operate together to form a display for device 10 (e.g., the images provided by respective left and right optical modules 40 may be viewed by the user's eyes in eye boxes 13 so that a stereoscopic image is created for the user). The left image from the left optical module fuses with the right image from a right optical module while the display is viewed by the user.

It may be desirable to monitor the user's eyes while the user's eyes are located in eye boxes 13. For example, it may be desirable to use a camera to capture images of the user's irises (or other portions of the user's eyes) for user authentication. It may also be desirable to monitor the direction of the user's gaze. Gaze tracking information may be used as a form of user input and/or may be used to determine where, within an image, image content resolution should be locally enhanced in a foveated imaging system. To ensure that device 10 can capture satisfactory eye images while a user's eyes are located in eye boxes 13, each optical module 40 may be provided with a camera such as camera 42 and one or more light sources such as light-emitting diodes 44 or other light-emitting devices such as lasers, lamps, etc. Cameras 42 and light-emitting diodes 44 may operate at any suitable wavelengths (visible, infrared, and/or ultraviolet). As an example, diodes 44 may emit infrared light that is invisible (or nearly invisible) to the user. This allows eye monitoring operations to be performed continuously without interfering with the user's ability to view images on displays 14.

Figure 2:
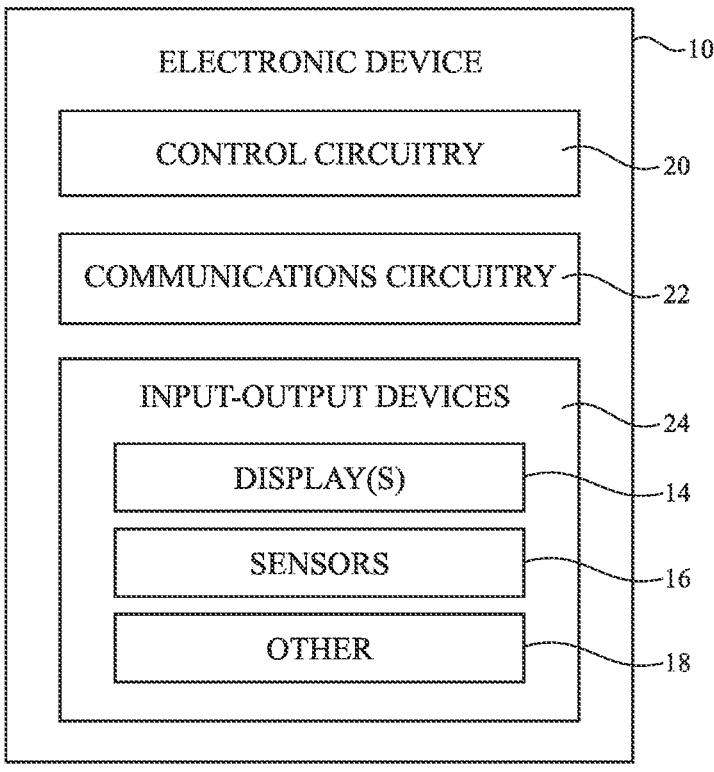
FIG. 2 is a schematic diagram of an illustrative electronic device in accordance with some embodiments.

A schematic diagram of an illustrative electronic device such as a head-mounted device or other wearable device is shown in FIG. 2. Device 10 of FIG. 2 may be operated as a stand-alone device and/or the resources of device 10 may be used to communicate with external electronic equipment. As an example, communications circuitry in device 10 may be used to transmit user input information, sensor information, and/or other information to external electronic devices (e.g., wirelessly or via wired connections). Each of these external devices may include components of the type shown by device 10 of FIG. 2.

As shown in FIG. 2, a head-mounted device such as device 10 may include control circuitry 20. Control circuitry 20 may include storage and processing circuitry for supporting the operation of device 10. The storage and processing circuitry may include storage such as nonvolatile memory (e.g., flash memory or other electrically-programmable-read-only memory configured to form a solid state drive), volatile memory (e.g., static or dynamic random-access-memory), etc. One or more processors in control circuitry 20 may be used to gather input from sensors and other input devices and may be used to control output devices. The processing circuitry may be based on one or more processors such as microprocessors, microcontrollers, digital signal processors, baseband processors and other wireless communications circuits, power management units, audio chips, application specific integrated circuits, etc. During operation, control circuitry 20 may use display(s) 14 and other output devices in providing a user with visual output and other output. Control circuitry 20 may be configured to perform operations in device 10 using hardware (e.g., dedicated hardware or circuitry), firmware, and/or software. Software code for performing operations in device 10 may be stored on storage circuitry (e.g., non-transitory (tangible) computer readable storage media that stores the software code). The software code may sometimes be referred to as program instructions, software, data, instructions, or code. The stored software code may be executed by the processing circuitry within circuitry 20.

To support communications between device 10 and external equipment, control circuitry 20 may communicate using communications circuitry 22. Circuitry 22 may include antennas, radio-frequency transceiver circuitry, and other wireless communications circuitry and/or wired communications circuitry. Circuitry 22, which may sometimes be referred to as control circuitry and/or control and communications circuitry, may support bidirectional wireless communications between device 10 and external equipment (e.g., a companion device such as a computer, cellular telephone, or other electronic device, an accessory such as a point device or a controller, computer stylus, or other input device, speakers or other output devices, etc.) over a wireless link.

For example, circuitry 22 may include radio-frequency transceiver circuitry such as wireless local area network transceiver circuitry configured to support communications over a wireless local area network link, near-field communications transceiver circuitry configured to support communications over a near-field communications link, cellular telephone transceiver circuitry configured to support communications over a cellular telephone link, or transceiver circuitry configured to support communications over any other suitable wired or wireless communications link. Wireless communications may, for example, be supported over a Bluetooth® link, a WiFi® link, a wireless link operating at a frequency between 10 GHz and 400 GHz, a 60 GHz link, or other millimeter wave link, a cellular telephone link, or other wireless communications link. Device 10 may, if desired, include power circuits for transmitting and/or receiving wired and/or wireless power and may include batteries or other energy storage devices. For example, device 10 may include a coil and rectifier to receive wireless power that is provided to circuitry in device 10.

Device 10 may include input-output devices such as devices 24. Input-output devices 24 may be used in gathering user input, in gathering information on the environment surrounding the user, and/or in providing a user with output. Devices 24 may include one or more displays such as display(s) 14. Display(s) 14 may include one or more display devices such as organic light-emitting diode display panels (panels with organic light-emitting diode pixels formed on polymer substrates or silicon substrates that contain pixel control circuitry), liquid crystal display panels, microelectromechanical systems displays (e.g., two-dimensional mirror arrays or scanning mirror display devices), display panels having pixel arrays formed from crystalline semiconductor light-emitting diode dies (sometimes referred to as microLEDs), and/or other display devices.

Sensors 16 in input-output devices 24 may include force sensors (e.g., strain gauges, capacitive force sensors, resistive force sensors, etc.), audio sensors such as microphones, touch and/or proximity sensors such as capacitive sensors such as a touch sensor that forms a button, trackpad, or other input device), and other sensors. If desired, sensors 16 may include optical sensors such as optical sensors that emit and detect light, ultrasonic sensors, optical touch sensors, optical proximity sensors, and/or other touch sensors and/or proximity sensors, monochromatic and color ambient light sensors, image sensors (e.g., cameras), fingerprint sensors, iris scanning sensors, retinal scanning sensors, and other biometric sensors, temperature sensors, sensors for measuring three-dimensional non-contact gestures ("air gestures"), pressure sensors, sensors for detecting position, orientation, and/or motion of device 10 and/or information about a pose of a user's head (e.g., accelerometers, magnetic sensors such as compass sensors, gyroscopes, and/or inertial measurement units that contain some or all of these sensors), health sensors such as blood oxygen sensors, heart rate sensors, blood flow sensors, and/or other health sensors, radio-frequency sensors, three-dimensional camera systems such as depth sensors (e.g., structured light sensors and/or depth sensors based on stereo imaging devices that capture three-dimensional images) and/or optical sensors such as self-mixing sensors and light detection and ranging (lidar) sensors that gather time-of-flight measurements (e.g., time-of-flight cameras), humidity sensors, moisture sensors, gaze tracking sensors, electromyography sensors to sense muscle activation, facial sensors, and/or other sensors. In some arrangements, device 10 may use sensors 16 and/or other input-output devices to gather user input. For example, buttons may be used to gather button press input, touch sensors overlapping displays can be used for gathering user touch screen input, touch pads may be used in gathering touch input, microphones may be used for gathering audio input (e.g., voice commands), accelerometers may be used in monitoring when a finger contacts an input surface and may therefore be used to gather finger press input, etc.

If desired, electronic device 10 may include additional components (see, e.g., other devices 18 in input-output devices 24). The additional components may include haptic output devices, actuators for moving movable housing structures, audio output devices such as speakers, light-emitting diodes for status indicators, light sources such as light-emitting diodes that illuminate portions of a housing and/or display structure, other optical output devices, and/or other circuitry for gathering input and/or providing output. Device 10 may also include a battery or other energy storage device, connector ports for supporting wired communication with ancillary equipment and for receiving wired power, and other circuitry.

Display(s) 14 can be used to present a variety of content to a user's eye. The left and right displays 14 that are used to present a fused stereoscopic image to the user's eyes when viewing through eye boxes 13 can sometimes be referred to collectively as a display 14. As an example, virtual reality (VR) content can be presented by display 14. Virtual reality content may refer to content that only includes virtual objects within a virtual reality (computer-generated) environment. As another example, mixed reality (MR) content can be presented by display 14. Mixed reality content may refer to content that includes virtual objects and real objects from the real-world physical environment in which device 10 is being operated. As another example, only real-world content can be presented by display 14. The real-world content may refer to images being captured by one or more front-facing cameras (see, e.g., cameras 46 in FIG. 1) and passed through as a live feed to the user. The real-world content being captured by the front-facing cameras is therefore sometimes referred to as a camera passthrough feed, a (live) video passthrough feed, or a passthrough video feed (stream).

A physical environment refers to a physical world that people can sense and/or interact with without the aid of an electronic device. In contrast, an extended reality (XR) environment refers to a wholly or partially simulated environment that people sense and/or interact with via an electronic device. For example, the XR environment may include augmented reality (AR) content, mixed reality (MR) content, virtual reality (VR) content, and/or the like. With an XR system, a subset of a person's physical motions, or representations thereof, are tracked, and, in response, one or more characteristics of one or more virtual objects simulated in the XR environment are adjusted in a manner that comports with at least one law of physics.

A user wearing an electronic device 10 such as the head-mounted device 10 of FIG. 1 may view the displays 14 of device 10 under an "immersive" viewing condition, which can be defined herein as a viewing condition or viewing environment in which the user sees the passthrough content output from displays 14 when device 10 is mounted on the user's head. Because device 10 is mounted in front of and covering the user's eyes, the housing 12 of device 10 (see FIG. 1), which is typically made of opaque material, will block the ambient light from the surrounding environment (scene). As a result, the immersive viewing condition of device 10 will be determined by a peak/maximum brightness level (in nits) of displays 14. An immersive viewing condition can thus also refer to a viewing environment that is predominately dark, such as in a dimly lit movie theater or a dark room.

In contrast, a user who is not wearing head-mounted device 10 may view the surrounding environment (scene)

under a "non-immersive" viewing condition, which can be defined herein as a viewing condition or viewing environment in which the user directly sees the surrounding scene when device 10 is not worn on the user's head. Since device 10 is no longer blocking the user's eyes, the user's eyes are exposed to the surrounding scene. As a result, the non-immersive viewing condition can vary depending on the brightness of ambient light (hereinafter referred to as the "ambient lux level") within the scene. When the ambient lux level of the scene is high, the non-immersive viewing condition will be bright. When the ambient lux level of the scene is low, the non-immersive viewing condition will be dark. In general, non-head-mounted devices such as cellular telephones, laptop computers, desktop computers, tablet computers, wristwatches, voice-controlled speakers, smart home devices, monitors, televisions, and other types of electronic devices that are not worn over the user's eyes are operated in a non-immersive viewing condition or environment.

The human eye perceives color differently depending on the current viewing condition (e.g., the chromatic or color adaptation behavior of the human visual system can vary based on whether the current viewing state is the immersive viewing condition or other non-immersive viewing conditions). In accordance with an embodiment, device 10 may be operated using a chromatic (color) adaptation model configured to mimic the behavior of the human vision system (i.e., the human eye) such that the perceived color of the passthrough video feed of a given captured scene output by displays 14 matches the perceived color of the same given scene if the user were to view the same scene without wearing device 10. In other words, device 10 can be provided with a color adaptation model that corrects/adjusts the passthrough video feed in a way such that the resulting corrected color of the passthrough video feed perceived by the user under an immersive viewing condition matches the color perceived by the user if the user were to view the same scene or content under a non-immersive viewing condition (e.g., if the user were to view the same scene while not wearing a head-mounted device or if the user were to view the same captured content on a non-head-mounted device).

Figure 3:
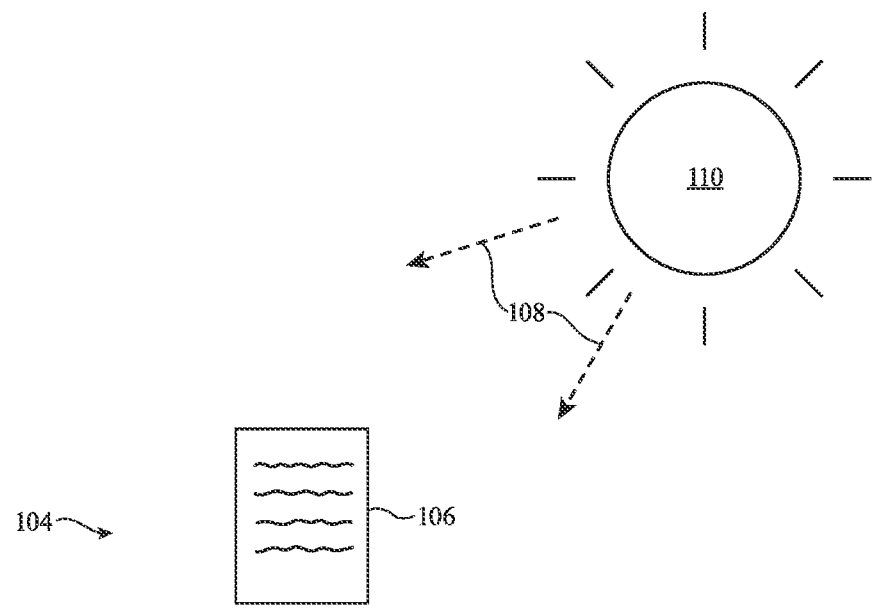
FIG. 3 is a diagram showing an electronic device being operated in a bright daylight environment in accordance with some embodiments.
Figure 3:
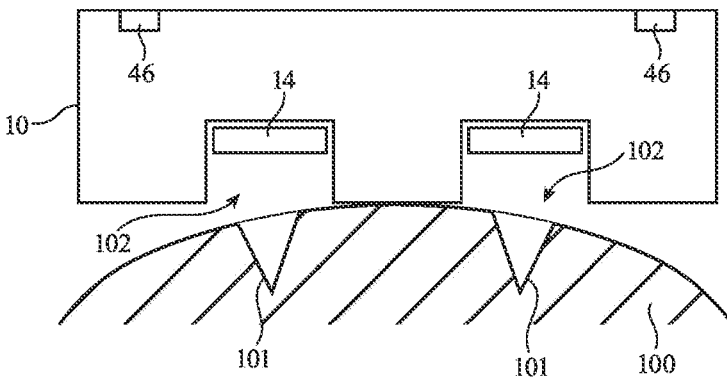

FIG. 3 is a diagram showing device 10 being operated in a bright daylight environment in accordance with some embodiments. As shown in FIG. 3, device 10 may be worn on a user's head 100, and one or more front-facing cameras 46 can be used to capture a video feed of the surrounding scene 104. The surrounding scene 104 may, for example, include a piece of paper 106 that is illuminated by daylight 108 emitted from the sun 110. Scene 104 may therefore represent an outdoor environment with relatively bright ambient light levels. Daylight 108 (or natural light) can be considered "warm" when casting an orange glow, such as during sunset, or can be considered "cold" when casting a blue hue, such as during a cloudy or overcast day. Warm light can refer to and be defined herein as light having a color temperature that ranges from 2200 Kelvin (K) to 3500 K, that is less than 3500 K, that is less than 3300 K, that is less than 3000 K, or that is less than 2700 K. Cold light can refer to and be defined herein as light having a color temperature that ranges from 4000 K to 7000 K, that is greater than 3500 K, that is greater than 4000 K, or that is greater than 5000 K.

Cameras 46 of device 10 may be used to capture a passthrough video feed of scene 104. Device 10 may process the captured video feed and output the processed video feed on displays 14. Since device 10 is worn on the user's head 100, the user's eyes such as eyes 101 can see the processed video feed output from the displays 14 under an immersive viewing condition. The immersive viewing condition can be determined by the internal viewing environment 102, which is determined by the peak brightness level of the display since the housing of device 10 will block out the ambient light in the surrounding scene 104. In this particular example of FIG. 3, consider the surrounding scene 104 as being illuminated by a relatively cold daylight 108 and exhibiting relatively high ambient lux (brightness) levels. If the user is not wearing or using device 10, the user's eyes 101 will naturally react and perceive scene 104 using a first amount (or degree) of color adaptation under this non-immersive viewing condition. If the user is wearing device 10, however, the user's eyes 101 will now adapt to the darker viewing environment 102 and will naturally react and perceive the displayed content, under the immersive viewing condition, using a second amount of color adaptation that is different than the first amount of color adaptation. If care is not taken, the color of paper 106 will appear differently to the user in the immersive viewing condition versus the non-immersive viewing condition. Device 10 may be provided with a camera image signal processing pipeline and/or a display processing pipeline implementing a color correction scheme that accounts of this difference in the amount of color (chromatic) adaptation.

Figure 4:
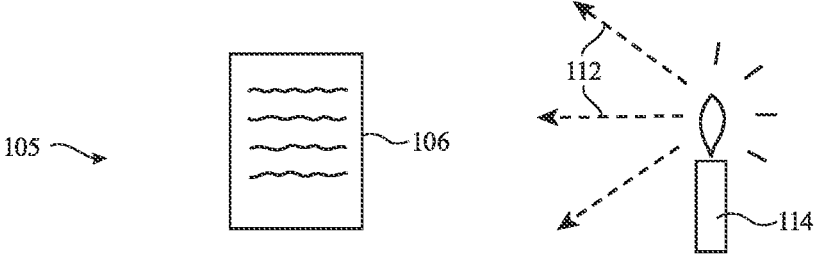
FIG. 4 is a diagram showing an electronic device being operated in a dim warm light environment in accordance with some embodiments.
Figure 4:
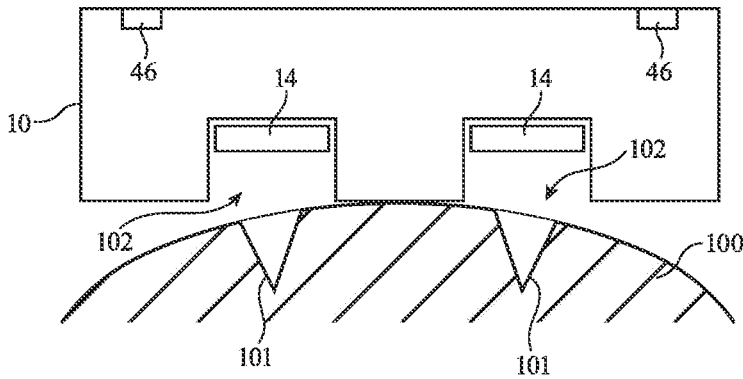

FIG. 4 is a diagram showing device 10 being operated in a dim warm light environment in accordance with some embodiments. As shown in FIG. 3, device 10 may be worn on a user's head 100, and one or more front-facing cameras 46 can be used to capture a video feed of the surrounding scene 105. The surrounding scene 105 may, for example, include a piece of paper 106 that is illuminated by a warm glow 112 emitted from a candle 114. Scene 105 may represent an indoor environment with relatively low ambient lux levels. Cameras 46 of device 10 may be used to capture a passthrough video feed of scene 105. Device 10 may process the captured video feed and output the processed video feed on displays 14. Since device 10 is worn on the user's head 100, the user's eyes such as eyes 101 can see the processed video feed output from the displays 14 under an immersive viewing condition. The immersive viewing condition can be determined by the internal viewing environment 102, which is determined by the peak brightness of displays 14 since the housing of device 10 will block out the ambient light in the surrounding scene 105.

In this particular example of FIG. 4, the surrounding scene 105 is being illuminated by a relatively warm candle-light 112 and exhibits relatively low (dim) ambient lux levels. If the user is not wearing or using device 10, the user's eyes 101 will naturally react and perceive scene 104 using a third amount of color adaptation under this non-immersive viewing condition. If the user is wearing device 10, however, the user's eyes 101 will now adapt to the dark viewing environment 102 and will naturally react and perceive the displayed content, under the immersive viewing condition, using a fourth amount of color adaptation that is potentially different than the third amount of color adaptation. If care is not taken, the color of paper 106 illuminated by candlelight 112 will appear differently to the user in the immersive viewing condition versus the non-immersive viewing condition. Device 10 may be provided with a display processing pipeline implementing a chromatic correction scheme that accounts of this difference in the amount of color (chromatic) adaptation.

Figure 5:
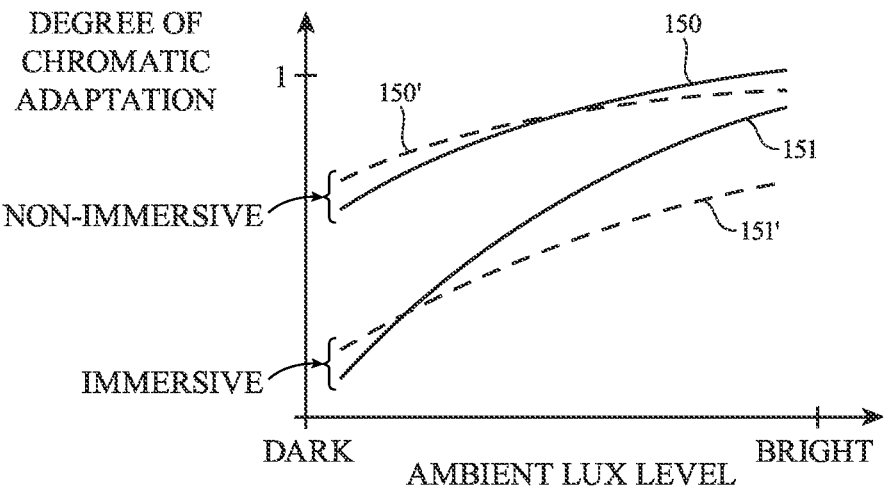
FIG. 5 is a plot showing varying degrees of chromatic adaptation as a function of ambient brightness levels under immersive and non-immersive viewing conditions in accordance with some embodiments.

FIG. 5 is a plot showing varying degrees of chromatic adaptation as a function of ambient lux levels under immersive and non-immersive viewing conditions in accordance with some embodiments. The terms "chromatic adaptation" and "color adaptation" can be used interchangeably herein. Curve 150 represents a chromatic (color) adaptation level profile or model that depends on ambient lux levels corresponding to a non-immersive viewing condition that can be implemented by device 10 when displays 14 exhibit a first peak brightness level. On the other hand, curve 151 represents a chromatic (color) adaptation level profile or model that depends on ambient lux levels corresponding to an immersive viewing condition when displays 14 exhibit the first peak brightness level. Curve 150 is therefore sometimes referred to as a non-immersive viewing condition color adaptation level profile/model, whereas curve 151 is sometimes referred to as an immersive viewing condition color adaptation level profile/model.

Across all ambient lux levels, the non-immersive viewing condition color adaptation profile 150 exhibits a higher amount or degree of color adaptation than the immersive viewing condition color adaptation level profile 151. At high ambient lux levels (e.g., at very bright levels such as when the scene being captured is illuminated by sunlight or other bright lighting), the non-immersive viewing condition might require full or more color adaptation relative to the immersive viewing case. At low ambient lux levels (e.g., at very dark levels such as when the scene being captured is illuminated by moonlight or other dim lighting), the immersive viewing condition might require much lower color adaptation relative to the non-immersive viewing case. A higher amount/degree of color adaptation may indicate a greater degree of color adjustment to neutral gray or white point, whereas a lower amount of color adaptation may indicate a lesser degree of color adjustment to neutral gray or white point.

The degree of color adaptation for the non-immersive and immersive viewing conditions can change depending on the peak/maximum brightness level of displays 14. As shown in FIG. 5, curve 150' represents a chromatic (color) adaptation level profile or model that depends on ambient lux levels corresponding to a non-immersive viewing condition that can be implemented by device 10 when displays 14 exhibit a second peak brightness level greater than the first peak brightness level. On the other hand, curve 151' represents a chromatic (color) adaptation level profile or model that depends on ambient lux levels corresponding to an immersive viewing condition when displays 14 exhibit the second peak brightness level. As an illustrative example, the first peak brightness level can be equal to 100 nits, whereas the second peak brightness level can be equal to 300 nits. As shown in FIG. 5, the non-immersive viewing condition color adaptation curves 150 and 150' tend to exhibit lesser difference or variance as the peak brightness level varies, whereas the immersive viewing condition color adaptation curves 151 and 151' tend to exhibit greater difference or variance as the peak brightness level varies.

Figure 6:
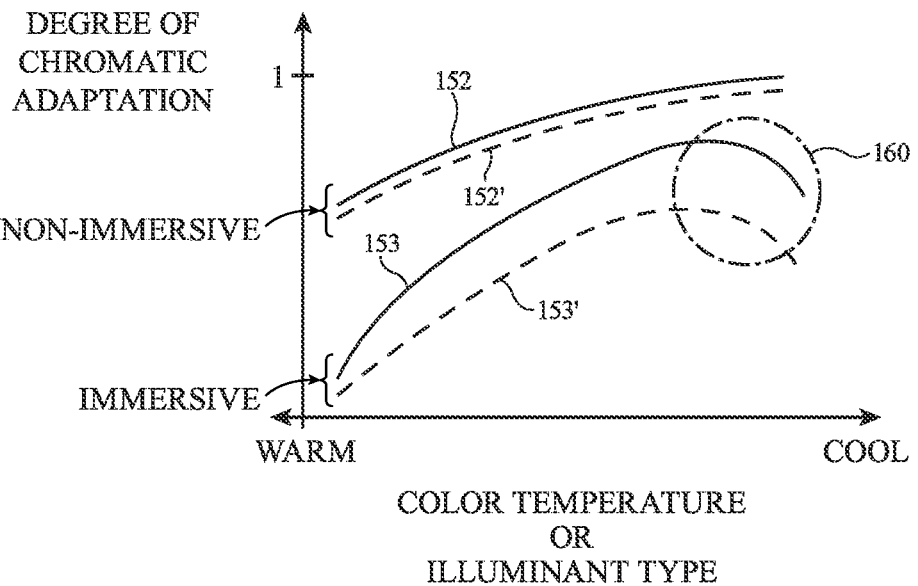
FIG. 6 is a plot showing varying degrees of chromatic adaptation as a function of illuminant color temperature in accordance with some embodiments.

FIG. 6 is a plot showing varying degrees of chromatic adaptation as a function of the illuminant color temperature under immersive and non-immersive viewing conditions in accordance with some embodiments. A light source within a scene or environment is sometimes referred to herein as an illuminant. In general, an environment can include one or more types of illuminants (e.g., a scene can include only one type of light source, two types of light sources, three to five types of light sources, five to ten types of light sources, or more than ten different types of light sources). The illuminant color temperature on the x-axis of the plot of FIG. 6 may represent the color temperature of the dominant illuminant in the scene or can also represent a type of illuminant in the scene (e.g., whether the detected light source is a black-body light source, a non-black-body light source, or other light source). The color temperature is sometimes referred to as a "correlated" color temperature (CCT) that is mapped to the color temperature of a black body light source.

Curve 152 represents a chromatic (color) adaptation level profile or model that depends on the color temperature of the ambient light corresponding to non-immersive viewing condition that can be implemented by device 10 when displays 14 exhibit the first peak brightness level. On the other hand, curve 153 represents a chromatic (color) adaptation level profile or model that depends on the color temperature of the ambient light corresponding to an immersive viewing condition that can be implemented by device 10 when displays 14 exhibit the first peak brightness level. Curve 152 is therefore sometimes referred to as a non-immersive viewing condition color adaptation level profile/model, whereas curve 153 is sometimes referred to as an immersive viewing condition color adaptation level profile/model.

Across all color temperatures, the non-immersive viewing condition color adaptation level profile 152 exhibits a higher amount or degree of color adaptation than the immersive viewing condition color adaptation level profile 153. At high(er) or cool(er) color temperatures, the non-immersive viewing condition might require full or higher color adaptation relative to the immersive viewing case. At low(er) or warm(er) color temperatures, the immersive viewing condition color adaptation level profile 153 exhibits a lower amount or degree of color adaptation than the non-immersive viewing condition color adaptation level profile 152 (e.g., the immersive viewing condition might require much less or minimal color adaptation at low or warm color temperatures relative to the non-immersive viewing case). A higher amount/degree of color adaptation may indicate a greater degree of color adjustment to neutral gray or white point, whereas a lower amount of color adaptation may indicate a lesser degree of color adjustment to neutral gray or white point.

The degree of color adaptation for the non-immersive and immersive viewing conditions as a function of color temperature can also change depending on the peak/maximum brightness level of displays 14. As shown in FIG. 6, curve 152' represents a chromatic (color) adaptation level profile or model that depends on the color temperature corresponding to a non-immersive viewing condition that can be implemented by device 10 when displays 14 exhibit the second peak brightness level greater than the first peak brightness level. On the other hand, curve 153' represents a chromatic (color) adaptation level profile or model that depends on the color temperature corresponding to an immersive viewing condition when displays 14 exhibit the second peak brightness level. As an illustrative example, the first peak brightness level can be equal to 100 nits, whereas the second peak brightness level can be equal to 300 nits or other value greater than the first peak brightness level. As shown in FIG. 6, the non-immersive viewing condition color adaptation curves 152 and 152' tend to exhibit lesser difference or variance as the peak brightness level varies, whereas the immersive viewing condition color adaptation curves 153 and 153' tend to exhibit greater difference or variance as the peak brightness level varies. At very high color temperatures, the degree of color adaptation may actually be ramped down for the immersive viewing condition since the human response cannot fully adapt in very cool lighting conditions in the immersive viewing case (see, e.g., curves 153 and 153 drooping in region 160).

The example of FIG. 3 in which scene 104 exhibits high ambient lux level with a cold illuminant and the example of FIG. 4 in which scene 105 exhibits low ambient lux level with a warm illuminant are illustrative and are not intended to limit the scope of the present embodiments. As another example, device 10 may be operated in a scene having high ambient lux level that is illuminated by a warm or warmer light source. As another example, device 10 may be operated in a scene having low ambient lux level that is illuminated by a cold or colder light source. In general, device 10 may be operated in a scene having a high, low, or moderate ambient lux level and that is illuminated by a cold, neutral, or warm light source.

In accordance with some embodiments, the desired amount of chromatic adaptation level employed by device 10 can be controlled predominantly based on the illuminant color temperature (as shown by curve 152 of FIG. 6). In accordance with other embodiments, the desired amount of chromatic adaptation level applied by device 10 can be controlled predominantly based on the ambient lux level (as shown by curve 150 of FIG. 5) computed from the captured video feed or image. In accordance with yet other embodiments, the desired amount of chromatic adaptation level can be a function of a weighted sum of the ambient lux level and the color temperature of the ambient light. The amount of chromatic adaptation used by device 10 to perform color correction operations on the captured passthrough feed can be represented by a chromatic (color) adaptation model that may be encoded in some data structure such as a chromatic (color) adaptation matrix.

Figure 7:
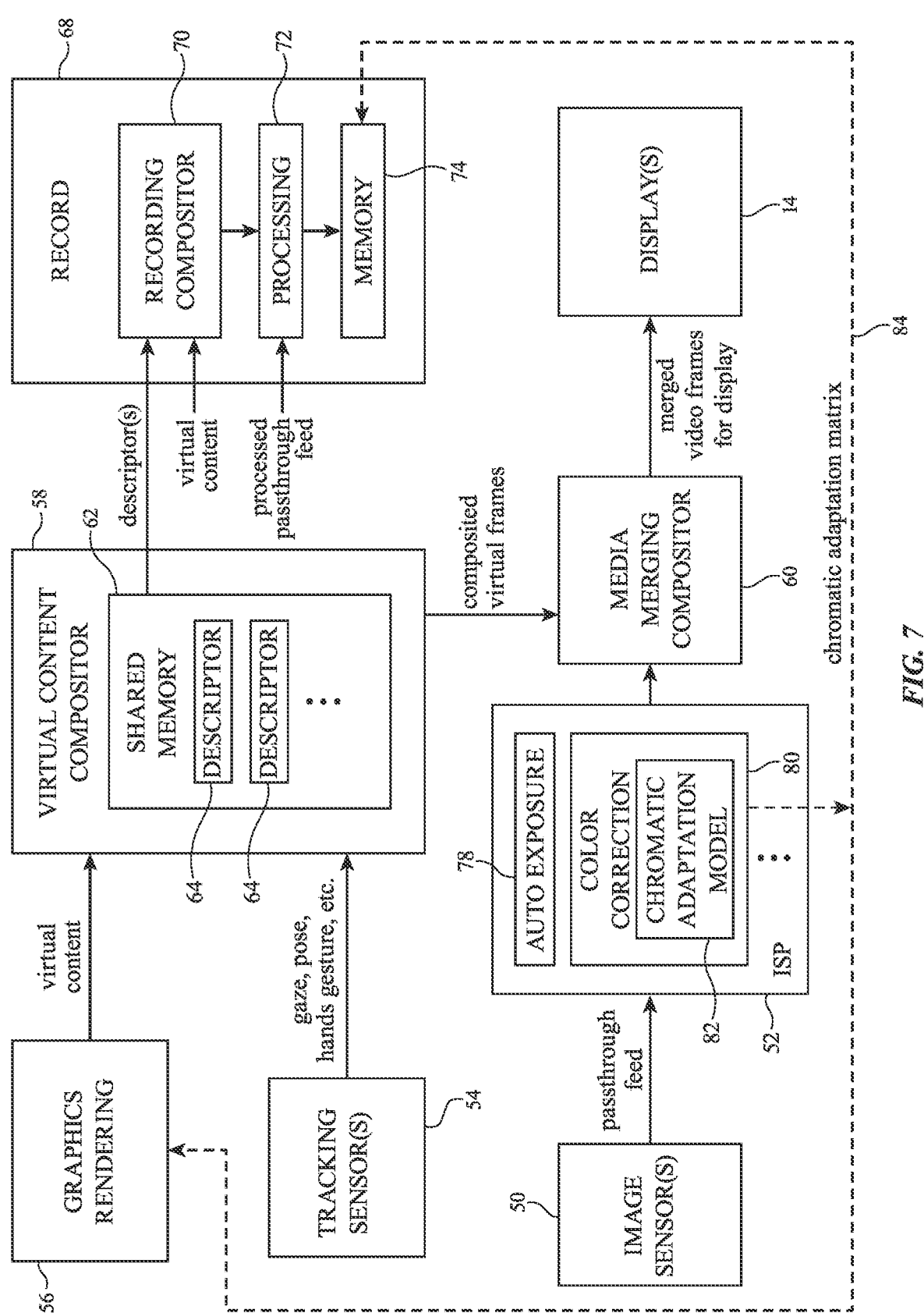
FIG. 7 is a diagram of illustrative display and recording pipelines within an electronic device in accordance with some embodiments.

In certain applications, it may be desirable to record a version of the real-world content or the extended reality content that is presented on display 14 of head-mounted electronic device 10. Such recording can be stored for later viewing, can be used for debugging or troubleshooting, or can be shared with external devices or a remote server. FIG. 7 is a diagram showing various hardware and software subsystems that can be included within device 10 for displaying content and for separately recording a version of the displayed content. The content can be displayed at a first frame rate and can optionally be recorded at a second frame rate different than the first frame rate. As shown in FIG. 7, device 10 can include a graphics rendering subsystem such as graphics rendering pipeline 56, user tracking subsystems including one or more tracking sensor(s) 54, imaging subsystems including one or more image sensor(s) 50, an image signal processing subsystem such as image signal processor (ISP) 52, a virtual content compositing subsystem such as virtual content compositor 58, and a media merging subsystem such as media merging compositor 60.

Graphics rendering pipeline 56, sometimes referred to as a graphics rendering engine or graphics renderer, can be configured to render or generate virtual content (e.g., virtual reality content, augmented reality content, mixed reality content, or extended reality content) or may be used to carry out other graphics processing functions. The virtual content output from the graphics rendering pipeline can optionally be foveated (e.g., subsystem 56 can render foveated virtual content). Graphics rendering pipeline 56 can synthesize photorealistic or non-photorealistic images from one or more 2-dimensional or 3-dimensional model(s) defined in a scene file that contains information on how to simulate a variety of features such as information on shading (e.g., how color and brightness of a surface varies with lighting), shadows (e.g., how to cast shadows across an object), texture mapping (e.g., how to apply detail to surfaces), reflection, transparency or opacity (e.g., how light is transmitted through a solid object), translucency (e.g., how light is scattered through a solid object), refraction and diffraction, depth of field (e.g., how certain objects can appear out of focus when outside the depth of view), motion blur (e.g., how certain objects can appear blurry due to fast motion), and/or other visible features relating to the lighting or physical characteristics of objects in a scene. Graphics renderer 56 can apply rendering algorithms such as rasterization, ray casting, ray tracing, radiosity, or other graphics processing algorithms.

Tracking sensors 54 can include a gaze tracking subsystem, sometime referred to as a gaze tracker, configured to gather gaze information or point of gaze information. The gaze tracker may employ one or more inward facing camera(s) and/or other gaze-tracking components (e.g., eye-facing components and/or other light sources that emit beams of light so that reflections of the beams from a user's eyes may be detected) to monitor the user's eyes. One or more gaze-tracking sensor(s) may face a user's eyes and may track a user's gaze. A camera in gaze-tracking subsystem may determine the location of a user's eyes (e.g., the centers of the user's pupils), may determine the direction in which the user's eyes are oriented (the direction of the user's gaze), may determine the user's pupil size (e.g., so that light modulation and/or other optical parameters and/or the amount of gradualness with which one or more of these parameters is spatially adjusted and/or the area in which one or more of these optical parameters is adjusted based on the pupil size), may be used in monitoring the current focus of the lenses in the user's eyes (e.g., whether the user is focusing in the near field or far field, which may be used to assess whether a user is day dreaming or is thinking strategically or tactically), and/or other gaze information. Cameras in the gaze tracker may sometimes be referred to as inward-facing cameras, gaze-detection cameras, eye-tracking cameras, gaze-tracking cameras, or eye-monitoring cameras. If desired, other types of image sensors (e.g., infrared and/or visible light-emitting diodes and light detectors, etc.) may also be used in monitoring a user's gaze.

Tracking sensors 54 can also include a face and body tracking subsystem configured to perform face tracking (e.g., to capture images of the user's jaw, mouth, etc. while the device is worn on the head of the user) and body tracking (e.g., by capturing images of the user's torso, arms, hands, legs, etc. while the device is worn on the head of user). If desired, the face and body tracking subsystem can also track a user's head pose by directly determining any movement, yaw, pitch, roll, etc. for head-mounted device 10. The yaw, roll, and pitch of the user's head may collectively define a user's head pose.

Tracking sensor 54 can further include a hands tracking subsystem, sometimes referred to as a hands tracker, configured to monitor a user's hand motion/gesture to obtain hand gestures data. For example, the hands tracker may include a camera and/or other gestures tracking components (e.g., outward facing components and/or light sources that emit beams of light so that reflections of the beams from a user's hand may be detected) to monitor the user's hand(s). One or more hands-tracking sensor(s) 54 may be directed towards a user's hands and may track the motion associated with the user's hand(s), may determine whether the user is performing a swiping motion with his/her hand(s), may determine whether the user is performing a non-contact button press or object selection operation with his/her hand(s), may determine whether the user is performing a grabbing or gripping motion with his/her hand(s), may determine whether the user is pointing at a given object that is presented on display 14 using his/her hand(s) or fingers, may determine whether the user is performing a waving or bumping motion with his/her hand(s), or may generally measure/monitor three-dimensional non-contact gestures ("air gestures") associated with the user's hand(s). Tracking sensors 54 operable to obtain gaze, pose, hands gesture, and other information relating to a motion of a user of device 10 are sometimes referred to as user tracking sensors.

The virtual content generated by graphics rendering pipeline 56 and the user tracking information (e.g., point of gaze information, head pose information, hands gesture information, and information associated with other user body parts) output from user tracking sensors 54 can be conveyed to virtual content compositor 58. Based on content and information from multiple data sources, virtual content compositor 58 can generate corresponding composited virtual frames. The virtual content compositor 58 can perform a variety of compositor functions that adjusts the virtual content based on the user tracking information to help improve the image quality of the final content that will be displayed to the user. The adjustments to virtual content may be performed by virtual content compositor 58 and/or media merging compositor 60.

For example, virtual content compositor 58 can perform image warping operations to reproject the virtual content from one user perspective to another, dynamic foveation operations that adjust the detail or quality of a video feed based on the user's gaze (e.g., by increasing image detail or resolution of a video feed in the area of the user's gaze and/or reducing image detail or resolution of the video feed in areas not aligned with the user's gaze), lens distortion compensation operations to fix issues associated with the distortion that might be caused by lens(es) 30 in front of display 14, brightness adjustments, color shifting, chromatic aberration correction, optical crosstalk mitigation operations, and/or other optical correction processes to enhance the apparent quality of the composited virtual frames.

The decisions made by the virtual content compositor 58 or other display control functions to generate each composited virtual frame can be listed in a compositor descriptor such as descriptor 64. Descriptor 64 can include a list of image correction/adjustment parameters that were used in generating a corresponding composited virtual frame, including but not limited to which input frame(s) are used from the virtual content, a particular gaze parameter from the gaze tracker, a particular head pose parameter from the body tracker that can be used to determine how the image warping operations will be carried out, a particular hands gesture parameter from the hands tracker, a particular foveation parameter used in performing the dynamic foveation, a particular lens distortion compensation parameter, a particular brightness adjustment, a particular amount or type of color shifting, and/or a particular amount or degree of chromatic aberration correction that is currently being employed to generate that composited virtual frame.

The image correction or adjustment can be applied at virtual content compositor 58 or some other component such as media merging compositor 60. In embodiments where the image correction/adjustment is performed at media merging compositor 60, virtual content compositor 58 can send a mesh that includes corrections based on gaze parameter(s), head pose parameter(s), hands gesture parameter(s), image warping parameter(s), foveation parameter(s), brightness adjustment parameter(s), color adjustment parameter(s), chromatic aberration correction parameter(s), point of view correction parameter(s), and/or other parameters to media merging compositor 60. These correction parameters can be sent in the form of one or more compositor descriptor(s) 64, if desired, from virtual content compositor 58 to media merging compositor 60.

Operated in this way, virtual content compositor 58 can relay its image correction decisions to media merging compositor 60, and media merging compositor 60 can then execute those decisions on the virtual frames and/or the passthrough feed and subsequently perform the desired merging or blending of the corrected video frames. As a result, the merged video frames being conveyed to display 14 can be output in accordance with a first frame rate and/or a first set of image correction parameters provided from virtual content compositor 58 to media merging compositor 60, whereas the video frames being recorded in the recording pipeline 68 can be output in accordance with a second frame rate different than the first frame rate and/or a second set of image correction parameters provided from virtual content compositor 58 to recording pipeline 68.

A separate compositor descriptor 64 can be generated for each composited virtual frame. A plurality of compositor descriptors 64 corresponding to a series of composited virtual frames can be stored in a shared memory 62. Shared memory 62 may be implemented as volatile memory 38 such as random-access memory (e.g., dynamic RAM or static RAM). Alternatively, shared memory 62 might also be implemented as non-volatile memory. Examples of non-volatile memory include flash memory, solid-state drive (SSD), read-only memory (ROM), electrically programmable ROM, disk storage, hard disk drive, optical disc, etc. Each descriptor 64 can be a relatively small amount of data. Each descriptor 64 can, for example, be only hundreds or thousands of bytes of data (e.g., less than five kB of data, less than 10 kB of data, less than 100 KB of data, or less than one megabyte of data).

The composited virtual frames can be merged with a live video feed captured by one or more image sensor(s) 50 prior to being output at display 14. Sensors 50 may include one or more front-facing camera(s) and/or other cameras used to capture images of the external real-world environment surrounding device 10. A video feed output from camera(s) 50 can sometimes be referred to as the raw video feed or a live passthrough video stream. The passthrough feed output from camera(s) 50 can be processed by image signal processor (ISP) 52 configured to perform image signal processing functions that only rely on the input of the live camera feed itself. For example, ISP block 52 may be configured to perform automatic exposure for controlling an exposure setting for the passthrough video feed, automatic color correction (sometimes referred to as automatic white balance) for controlling a white balance, tone curve mapping, gamma correction, shading correction, noise reduction, black level adjustment, demosaicing, image sharpening, high dynamic range (HDR) correction, color space conversion, and/or other image signal processing functions (just to name a few) to output corresponding processed video frames.

Media merging compositor 60 may receive the processed video frames output from image signal processor 52, may receive the composited virtual frames output from virtual content compositor 58, and may overlay or other combine one or more portions of the composited virtual frames with the processed video frames to obtain corresponding merged video frames. The merged video frames output from the media merging compositor 60 can then be presented on display 14 to be viewed by the user of device 10. In the example of FIG. 7, the merged video frames may be displayed at a frame rate of X frames per second (fps). To accomplish this, virtual content compositor 58 may generate the composited virtual frames at X fps. As an example, X may be 90 fps. This is merely illustrative. In general, the content presented on display 14 can be output at less than 90 fps, 60 fps or less, 50 fps or less, 30 fps or less, greater than 90 fps, 120 fps, 150 fps, or other display frame rate.

To provide device 10 with recording capabilities, device 10 can include a separate recording subsystem such as recording pipeline 68. In contrast to the display pipeline which outputs merged video frames at X fps, the recording pipeline 68 can render or generate video frames for recording at Y fps, where Y is different than X. The recording frame rate Y may be less than the display frame rate X. As an example, Y may be 30 fps when X is 90 fps. This is merely illustrative. The recording frame rate Y may optionally be greater than the display frame rate X. In general, the content being recorded at the recording pipeline 68 can be rendered at less than 30 fps, 20 fps or less, 10 fps or less, greater than 30 fps, 60 fps, 90 fps, 120 fps, or other recording frame rate.

As shown in FIG. 7, the recording pipeline 68 may include a recording compositor 70, a recorder processing block 72, and recorder memory 74. Recording compositor 70 may receive virtual content output from graphics rendering pipeline 56 and may retrieve one or more compositor descriptor(s) 64 from shared memory 62. Operated in this way, recording compositor 70 can generate an equivalent composited virtual frame for recording purposes at a different frame rate using the image correction parameters or decisions listed in the retrieved descriptor(s) 64. Virtual frames output from recording compositor 70 is sometimes referred to or defined herein as "recomposited" virtual frames (e.g., virtual frames recomposited at a different frame rate or otherwise with different parameters than frames composited and displayed at display 14). The composited virtual frames output from the recording compositor 70 can optionally be merged, using recording processor 72, with the processed live passthrough feed output from the image signal processor 52. The merged video frames output from recording processor 72 can then be stored or recorded in memory 74. This example in which the merged content is being recorded is merely illustrative. If desired, the composited virtual frames output from recording compositor 70 and the processed passthrough feed can be separately stored at memory 74 without being merged together. In other suitable embodiments, the recording compositor 70 can output different layers (or files) each based on a different image correction parameter in the retrieved descriptor and the various layers (files) can be separately stored or recorded on memory 74 without being merged with any other layers or passthrough frames. For example, recording compositor 70 might output a passthrough video feed, recomposited virtual content frames generated based on the descriptors 64, a hands matting file obtained using a hands tracking subsystem, and/or other independent output streams for later processing.

In addition to the merging operation, recording processor 72 can optionally perform additional operations such as selecting a subset of the received frames for recording (e.g., selecting alternating frames to be recorded, selecting one out of every three frames to be recorded, selecting one out of every four frames to be recorded, selecting one out of every five to ten frames for recording, etc.), limiting the rendered frames to a smaller field of view (e.g., limiting the X or horizontal dimension of the rendered content, limiting the Y or vertical dimension of the rendered content, or otherwise constraining the size or scope of the frames to be recorded), undistorting the rendered content since the content being recorded might not be viewed through a lens during later playback, and video matting, just to name a few. The video matting operations can determine whether each portion of the recorded content shows the composited virtual content or the live passthrough content. In certain scenarios, the video matting operations might decide to show more of the live passthrough content when doing so would enhance the safety of the user (e.g., such as when a user might be moving towards an obstacle). In other scenarios, the video matting operations might intentionally obscure or blur a portion of the virtual content (e.g., such as when a user inputs a password or other sensitive information on the display screen, and the sensitive information can be obfuscated in the recording). These examples are merely illustrative. In another embodiment, a hands matting operation might detect a user's hand(s) in the passthrough feed and extract only that portion from the passthrough video feed. The extracted portion can later be blended with virtual content targeting only the user's hand(s). In general, the recording processor 72 can create or output recorded content that is at least partially different than the content that is being output from display 14.

To help protect the privacy of users, any personal user information that is gathered by sensors may be handled using best practices. These best practices including meeting or exceeding any privacy regulations that are applicable. Opt-in and opt-out options and/or other options may be provided that allow users to control usage of their personal data.

In the example of FIG. 7, ISP 52 may include an auto exposure (AE) subsystem such as AE block 78 for determining the ambient lux (brightness) level of the scene. For example, the brightness level can be computed using calibrated linear camera signals. The calibrated linear camera signals can then be translated to the brightness level based on a linear regression model. ISP 52 may also include a color correction subsystem such as color correction block 80 configured to perform color correction (auto white balancing or AWB) operations based on a chromatic adaptation model 82. Chromatic adaptation model 82 may refer to the immersive viewing condition chromatic adaptation profile 150 of the type shown in FIG. 5 or the immersive viewing condition chromatic adaptation profile 152 of the type shown in FIG. 6. The chromatic adaptation model 82 for mimicking the human eye (vision) response for an immersive viewing condition can be represented using any suitable data structure such as a chromatic adaptation matrix.

As shown in FIG. 7, the chromatic adaptation matrix can be conveyed to graphics rendering pipeline 56 via dotted path 84 so that pipeline 56 can render virtual content using a color setting that matches the processed passthrough video feed output from ISP 52. The chromatic adaptation matrix can also optionally be conveyed to the recording pipeline 68 via path 84 and stored in recorder memory 74. Operated in this way, the recording pipeline 68 can be made aware of the amount of color correction applied by the display pipeline and can selectively apply the same amount of color adaptation as specified by the chromatic adaptation matrix to the recorded content if the recorded content were to be later viewed under an immersive viewing condition or can selectively apply a different amount of color adaptation to the recorded content if the recorded content were to be later viewed under a non-immersive viewing condition. This example in which the chromatic adaptation matrix is being used to match the virtual content to the passthrough content is illustrative. In other embodiments, an inverse of the chromatic adaptation matrix can be applied to the passthrough content (e.g., to remove any environment tint from the passthrough feed) to match the passthrough content to the virtual content.

FIG. 8 is a flow chart of illustrative steps for operating electronic device 10 of the type described in connection with FIGS. 1-7. During the operations of block 200, one or more sensors in device 10 can be used to detect an ambient lux (brightness) level in the scene to be captured. For example, device 10 can include one or more front-facing cameras for capturing a live passthrough feed (e.g., the ambient lux or brightness level can be computed from the captured video feed). Information detected using the front-facing cameras can be processed by auto exposure block 78 to determine a corresponding ambient lux level.

During the operations of block 202, one or more sensors in device 10 can be used to detect or estimate the color temperature and chromaticity value of an illuminant of the ambient lighting in the scene to be captured. For example, device 10 can include a flicker detection sensor or other color sensor configured to gather flicker information and to detect whether the illuminant(s) within the captured scene is a cold light source, a warm light source, a neutral light source (e.g., an illuminant that is considered neither cold nor warm), a black-body light source, a non-black-body light source, or other light source. In some embodiments, the flicker detection sensor can be included as part of sensors 16 in FIG. 2 and can include one or more light measurement channels. As examples, a flicker detection sensor might include a channel configured to measure infrared (IR) and visible light, a channel configured to measure only infrared light, and/or multiple channels configured to measure the light spectrum at many visible wavelengths. In some embodiments, a color sensor can be included as part of sensors 46 in FIG. 2. As an example, an RGB camera can be used to estimate the light source color temperature and chromaticity value. Although block 202 is shown as occurring after block 200, block 202 can be performed before or in parallel (simultaneously) with block 200.

During the operations of block 204, the color correction block 80 in the ISP 52 can determine a degree or amount of chromatic adaptation corresponding to the immersive viewing condition based on the ambient lux level detected during block 200 and/or based on the estimated color temperature or illuminant type detected during block 202. In some embodiments, the appropriate amount of chromatic adaptation may be based predominantly on the ambient lux level, as modeled by the immersive viewing condition chromatic adaptation profile 151 or 151' of FIG. 5. In other embodiments, the appropriate amount of chromatic adaptation may be based predominantly on the illuminant type or color temperature of the ambient light as modeled by the immersive viewing condition chromatic adaptation profile 153 or 153' of FIG. 6. In yet other embodiments, the appropriate amount of chromatic adaption may be a function of the ambient lux level, the illuminant type, color temperature, flicker information, the amount of IR component of the detected lighting in the captured scene, temporal information about the AC or DC component of the detected lighting in the captured scene, information about whether device 10 is likely located indoors or outdoors as determined using a flicker detection sensor, some combination of these factors, and/or other parameters. The amount of chromatic adaptation to be applied to the passthrough video feed can be encoded in the form of a chromatic adaptation matrix. For example, the degree of adaptation computed from line 151 will generate a corresponding chromatic adaptation matrix adapted for immersive viewing under a particular ambient lux level and display brightness combination. As another example, another chromatic adaptation matrix adapted for immersive viewing can be generated from line 151 under a different ambient lux level and/or display brightness combination. As another example, chromatic adaptation matrices adapted for non-immersive viewing can be generated based on line 150 for each ambient lux level and display brightness combination.

During the operations of block 206, ISP 52 can render the passthrough content using the chromatic adaptation matrix generated from block 204. For example, ISP 52 can perform color correction operations on the passthrough video feed using the chromatic adaptation matrix to output a corresponding color corrected video feed, sometimes also referred to as a chromatically adapted passthrough video feed.

During the operations of block 208, the graphics rendering pipeline 56 can render virtual content using the same chromatic adaptation matrix generated from block 204. In other words, the graphics rendering block can generate the virtual content using the chromatic adaptation matrix to output a corresponding color corrected virtual content, sometimes also referred to as chromatically adapted virtual content. Operated in this way, the chromatically adapted virtual content can be color matched with the chromatically adapted passthrough video feed such that the two can later be merged by media merging compositor 60 or recording processor 72 to obtain cohesive merged video frames at least in terms of the overall colors. Although block 208 is shown as occurring after block 206, the operations of block 208 can occur before or in parallel (simultaneously) with block 206.

During the operations of block 210, the one or more display(s) 14 on device 10 can present the merged video frames in the immersive viewing condition. The content of the merged video frames, which include at least the passthrough video feed captured using cameras 50 and the virtual content generated by graphics renderer 56, has been color corrected or chromatically adapted using the chromatic adaptation matrix generated during block 204.

During the operations of block 212, the recording pipeline 68 on device 10 can record some version of the displayed content. The chromatic adaptation model that was applied to the displayed content during blocks 206 and 208 can be saved as metadata (sometimes referred to herein as color metadata) in the recorder memory 74. During the operations of block 214, the recorded content and optionally the color metadata, which includes the chromatic adaptation matrix, can optionally be shared with or sent (exported) to one or more other electronic devices. The other devices receiving the shared information can present the recorded content in a non-immersive viewing condition or an immersive viewing condition.

During the operations of block 216, the other devices (e.g., cellular telephones, laptop computers, desktop computers, tablet computers, wristwatches, automated voice-controlled assistant, smart home devices, monitors, televisions, and other types of electronic devices that are not worn over the user's eyes) might render the recorded content for a non-immersive viewing condition. Such types of devices can sometimes be referred to as non-immersive viewing electronic devices. In such scenarios, the other non-immersive viewing devices would analyze the shared color metadata, which includes the chromatic adaptation matrix corresponding to the immersive viewing condition, and apply a different amount of color adaptation that is more suitable for the non-immersive viewing condition. For example, the other devices can selectively adjust or modify the values in the shared chromatic adaptation matrix, can convert the chromatic adaptation matrix to a different color space, or can boost the degree of chromatic adaptation. The non-immersive viewing devices can then render the shared recorded content using a modified version of the chromatic adaptation matrix (e.g., the non-immersive viewing devices can render the shared recorded content in its display pipeline using another version of the chromatic adaptation matrix that is adapted to the non-immersive viewing condition). This example in which the recorded content is modified at the non-immersive viewing device when the content is about to be displayed is illustrative. In other embodiments, the recorded content can be modified at the time of export (e.g., during block 214) either at device 10 before the content is shared or at the receiving non-immersive viewing device when the shared content is received. In other embodiments, converting a video stream generated for immersive viewing to non-immersive viewing can involve applying the inverse of the immersive viewing chromatic adaptation matrix to the video stream, and then applying the non-immersive viewing chromatic adaptation matrix to the resulting video stream.

The example above in which the other devices receiving the shared recorded content are non-immersive viewing electronic devices is illustrative. In other embodiments, the other devices receiving the shared recorded content can be devices (e.g., another head-mounted device) that would also present the recorded content in an immersive (dark) viewing condition. Such types of devices can sometimes be referred to as immersive viewing electronic devices. In such scenarios, the other immersive viewing devices would analyze the shared color metadata, which includes the chromatic adaptation matrix corresponding to the immersive viewing condition, and apply the same or similar amount of color adaptation specified in the chromatic adaptation matrix to the recorded content, which would be suitable for the immersive viewing condition. For example, the other devices can maintain at least some of the values in the shared chromatic adaptation matrix (e.g., to maintain the degree or amount of chromatic adaptation), can convert the chromatic adaptation values to a different color space, etc.

The example described above in which device 10 (e.g., an immersive viewing device) shares content recorded for immersive viewing to other external devices that might be non-immersive viewing devices or immersive viewing devices is illustrative. In other scenarios, device 10 can also receive (import) content recorded at an external non-immersive viewing device. For example, during the operations of block 218, content recorded at an external non-immersive viewing device and optionally the color metadata, which includes the chromatic adaptation matrix, can optionally be shared with or received (imported) at device 10.

During the operations of block 220, device 10 can render the imported content for immersive viewing condition. For example, device 10 would analyze the shared color metadata, which includes the chromatic adaptation matrix corresponding to the non-immersive viewing condition, and apply a different amount of color adaptation that is more suitable for the immersive viewing condition. Device 10 can selectively adjust or modify the values in the shared chromatic adaptation matrix, can convert the chromatic adaptation values to a different color space, or can reduce the degree of chromatic adaptation. Device 10 can then render the shared recorded content using a modified version of the chromatic adaptation matrix (e.g., device 10 can render the shared recorded content in its display pipeline using a version of the chromatic adaptation matrix that is adapted to the immersive viewing condition). This example in which the recorded content is modified at device 10 when the content is about to be displayed is illustrative. In other embodiments, the recorded content can be modified at the time of import (e.g., during block 218) either at the external non-immersive viewing device before the content is imported or at device 10 when the shared content is received. In other embodiments, converting a video stream generated for non-immersive viewing to immersive viewing can involve applying the inverse of the non-immersive viewing chromatic adaptation matrix to the video stream, and then applying the immersive viewing chromatic adaptation matrix to the resulting video stream.

The methods and operations described above in connection with FIGS. 1-8 may be performed by the components of device 10 using software, firmware, and/or hardware (e.g., dedicated circuitry or hardware). Software code for performing these operations may be stored on non-transitory computer readable storage media (e.g., tangible computer readable storage media) stored on one or more of the components of device 10 (e.g., the storage circuitry within control circuitry 20 of FIG. 1). The software code may sometimes be referred to as software, data, instructions, program instructions, or code. The non-transitory computer readable storage media may include drives, non-volatile memory such as non-volatile random-access memory (NVRAM), removable flash drives or other removable media, other types of random-access memory, etc. Software stored on the non-transitory computer readable storage media may be executed by processing circuitry on one or more of the components of device 10 (e.g., one or more processors in control circuitry 20). The processing circuitry may include microprocessors, application processors, digital signal processors, central processing units (CPUs), application-specific integrated circuits with processing circuitry, or other processing circuitry.

Many different types of electronic systems can enable a person to sense and/or interact with various XR environments. Examples include head mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers.

The foregoing is merely illustrative and various modifications can be made to the described embodiments. The foregoing embodiments may be implemented individually or in any combination.

What is claimed is:

1. A method of operating an electronic device having one or more image sensors and one or more displays, the method comprising:

capturing a video feed using the one or more image sensors;

performing color correction on the captured video feed based on a brightness level computed from the captured video feed and a first chromatic adaptation model adapted to an immersive viewing condition to generate a corresponding color corrected video feed adapted to the immersive viewing condition, wherein the first chromatic adaptation model is a function of a peak brightness level of the one or more displays;

outputting the color corrected video feed using the one or more displays of the electronic device;

recording a version of the captured video feed; and sending the recorded version of the captured video feed to an external electronic device, wherein the external electronic device is configured to display the recorded version of the captured video feed that is color corrected using a second chromatic adaptation model adapted to a non-immersive viewing condition.

2. The method of claim 1, further comprising:

computing the brightness level using calibrated linear camera signals in the electronic device.

3. The method of claim 2, further comprising:

translating the calibrated linear camera signals to the brightness level using a linear regression model.

4. The method of claim 1, wherein:

the first chromatic adaptation model adapted to the immersive viewing condition exhibits a first degree of color adaptation when the computed brightness level is at a first brightness level and exhibits a second degree of color adaptation when the computed brightness level is at a second brightness level greater than the first brightness level; and the second chromatic adaptation model adapted to the non-immersive viewing condition exhibits a third degree of color adaptation greater than the first degree of color adaptation when the computed brightness level is at the first brightness level and exhibits a fourth degree of color adaptation greater than the second degree of color adaptation when the computed brightness level of the captured video feed is at the second brightness level.

5. The method of claim 1, further comprising:

receiving content from another external electronic device; and outputting the received content using the one or more displays that is color corrected using the first chromatic adaptation model adapted to the immersive viewing condition.

6. The method of claim 1, further comprising:

rendering virtual content;

performing color correction on the virtual content using the first chromatic adaptation model adapted to the immersive viewing condition to generate corresponding color corrected virtual content;

merging the color corrected video feed with the color corrected virtual content to create a merged video feed; and outputting the merged video feed using the one or more displays for immersive viewing.

7. The method of claim 1, further comprising:

rendering virtual content;

modifying the captured video feed using an inverted version of the first chromatic adaptation model to generate a corresponding modified video feed;

merging the modified video feed with the virtual content to create a merged video feed; and outputting the merged video feed using the one or more displays for immersive viewing.

8. The method of claim 1, further comprising:

performing color correction on the captured video feed based on a color temperature or an illuminant type of lighting in the captured video feed.

9. A method of operating an electronic device having one or more image sensors and one or more displays, the method comprising:

capturing a video feed using the one or more image sensors;

performing color correction on the captured video feed based on a color temperature or illuminant type of lighting in the captured video feed and a first chromatic adaptation model that is a function of a peak brightness level of the one or more displays to generate a corresponding color corrected video feed that is adapted to an immersive viewing condition;

outputting the color corrected video feed using the one or more displays of the electronic device;

recording a version of the captured video feed; and sending the recorded version of the captured video feed to an external electronic device, wherein the external electronic device is configured to display the recorded version of the captured video feed that is color corrected using a second chromatic adaptation model adapted to a non-immersive viewing condition.

10. The method of claim 9, further comprising:

performing color correction on the captured video feed based on a brightness level computed from the captured video feed.

11. The method of claim 9, wherein:

the first chromatic exhibits a first degree of color adaptation when the color temperature of the captured video feed is at a first value and exhibits a second degree of color adaptation when the color temperature of the captured video feed is at a second value greater than the first value; and the second chromatic adaptation model exhibits a third degree of color adaptation greater than the first degree of color adaptation when the color temperature of the captured video feed is at the first value and exhibits a fourth degree of color adaptation greater than the second degree of color adaptation when the color temperature of the captured video feed is at the second value.

12. The method of claim 9, further comprising:

receiving content from another external electronic device; and outputting the received content using the one or more displays that has been color corrected using the first chromatic adaptation model.

13. A method comprising:

with one or more image sensors, capturing a video feed;

rendering the video feed using a chromatic adaptation matrix adapted to an immersive viewing condition, wherein the chromatic adaptation matrix is a function of a brightness level of the captured video feed and a peak display brightness;

recording a version of the captured video feed;

modifying the chromatic adaptation matrix to produce a modified chromatic adaptation matrix adapted to a non-immersive viewing condition;

rendering the recorded version of the captured video feed using the modified chromatic adaptation matrix adapted to the non-immersive viewing condition to produce a color corrected video feed; and with one or more displays, outputting the color corrected video feed.

14. The method of claim 13, further comprising:

generating the chromatic adaptation matrix based on a color temperature of ambient light in the captured video feed.

15. The method of claim 13, further comprising:

detecting a type of light source in the captured video feed; and generating the chromatic adaptation matrix based on the detected type of light source in the captured video feed.

16. A method comprising:

with one or more image sensors, capturing a video feed;

rendering the captured video feed using a chromatic adaptation matrix adapted to a non-immersive viewing condition, wherein the chromatic adaptation matrix is a function of a brightness level of the captured video feed and a peak display brightness;

recording a version of the captured video feed;

modifying the chromatic adaptation matrix to produce a modified chromatic adaptation matrix adapted to an immersive viewing condition;

rendering the recorded version of the captured video feed using the modified chromatic adaptation matrix adapted to the immersive viewing condition to produce a color corrected video feed; and with one or more displays, outputting the color corrected video feed.

* * * * *